Inventors
William Henry Heggs
Harold Grimaldi Heather
By their Attorney

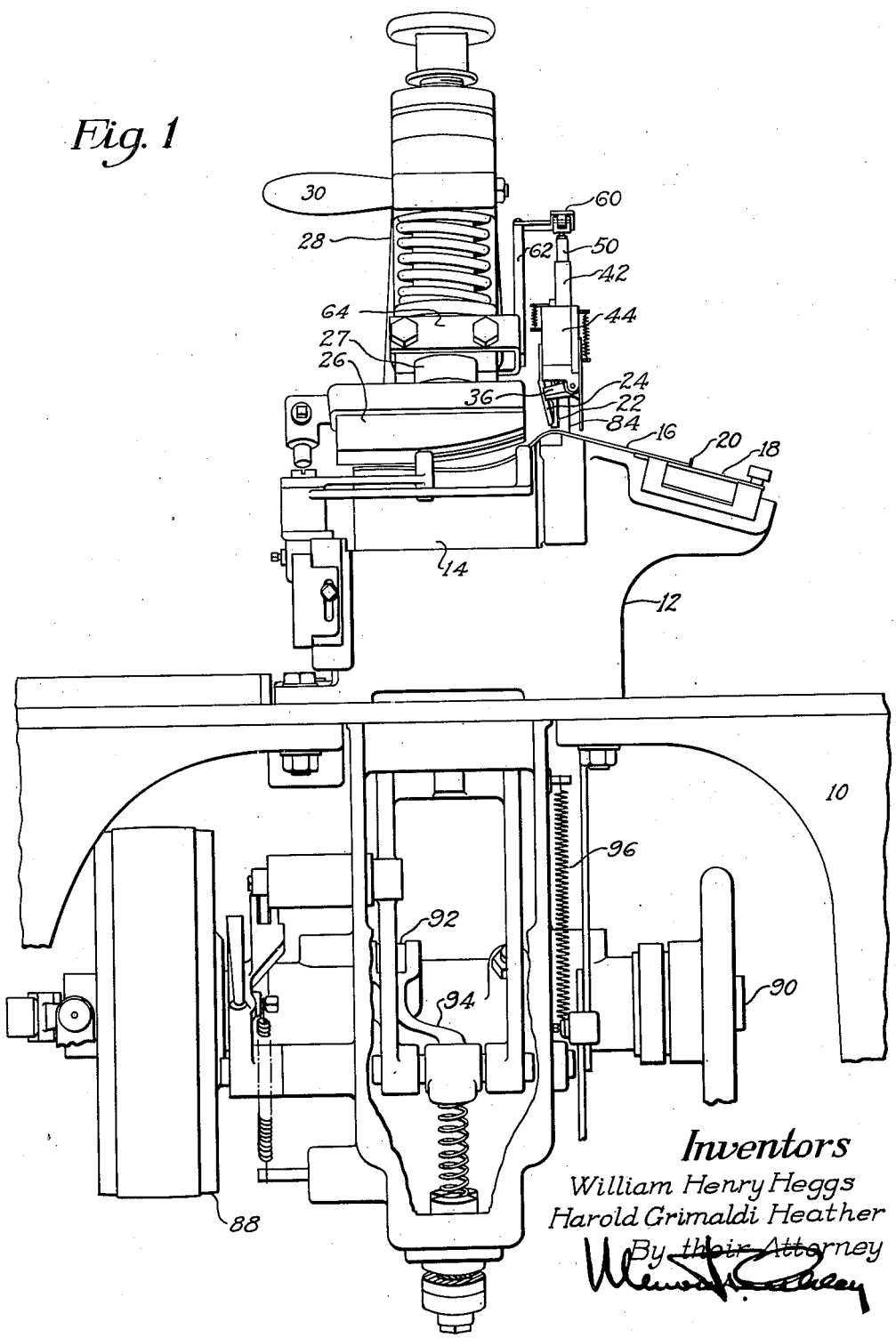

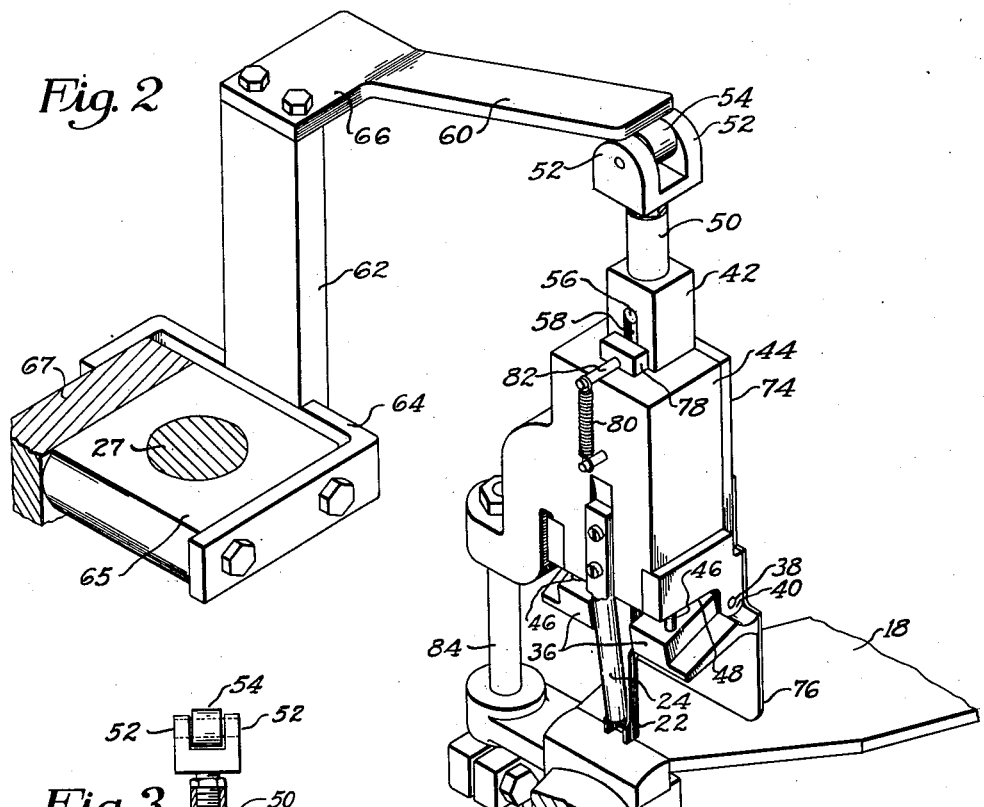
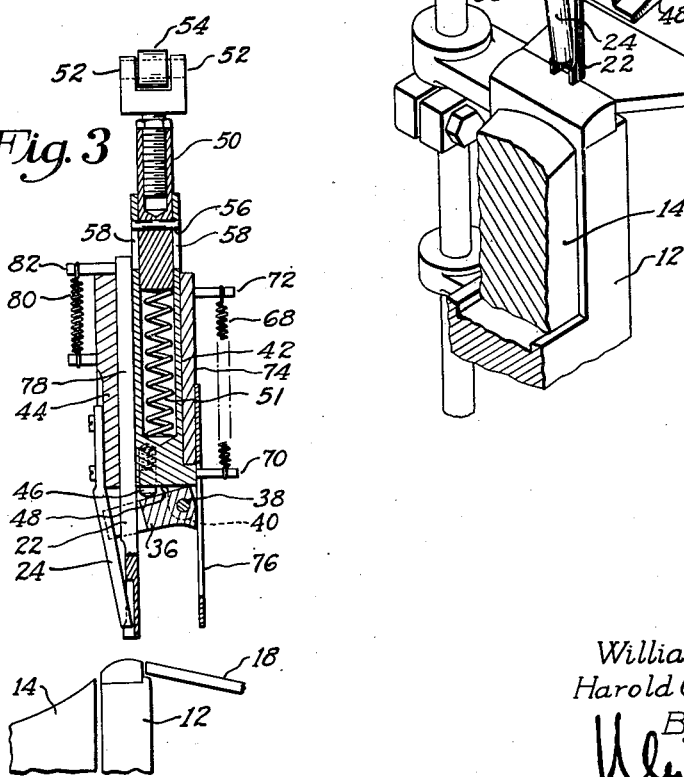

Patented June 7, 1949

2,472,210

UNITED STATES PATENT OFFICE 2,472,210

MACHINE FOR ASSEMBLING AND MOLDING SHOE BOTTOM PARTS

William Henry Heggs and Harold Grimaldi Heather, Leicester, England, assignors to United Shoe Machinery Corporation, Flemington, N. J., a corporation of New Jersey Application October 17, 1946, Serial No. 703,870 In Great Britain April 17, 1946

17 Claims. (Cl. 12—17)

This invention relates to machines for applying pressure to shoe bottom parts, and is herein illustrated in its application to machines particularly adapted to assemble and attach together an insole, a sole member reinforcing the shank portion and heel end portion of the insole and hereinafter referred to as a shank and heel piece, and a shank stiffener positioned between said sole members. Such a machine is disclosed in United States Letters Patent No. 2,083,583, granted June 15, 1937, in the name of John M. Whelton. The machine illustrated in said patent is provided with a work support on which the two sole members and the shank stiffener are mounted, a stiffener locating member constructed and arranged to engage a sole member on the work support, a stiffener holddown, and a presser for pressing the sole members together upon the work support.

In the manufacture of shoes provided with shoe bottom units comprising an insole, a shank and heel piece, and a shank stiffener it is the practice in some shoe factories to bevel the side margins of the shank and heel piece after the parts have been assembled and initially cement attached together in a machine such as that illustrated in the Whelton patent above referred to but before the parts have been subjected to heavy pressure to attach them securely together throughout the entire extent of their contacting surfaces. The machine of the Whelton patent is provided with a presser which engages a portion only of a shank a presser which engages a portion only of a shank and heel piece mounted on an insole, said portion extending from the heel end of the shank and heel piece to a line located about an inch from its toeward end. Such a presser effects an initial attachment of the shank and heel piece to the insole which is entirely satisfactory when there is no intervening operation between the assembling of the parts and the application of pressure to attach the parts permanently together. But when, as in the process above referred to, an operation is to be performed upon the side marginal portions of the shank and heel piece during the interval between the assembling and the attaching operations, it is desirable that means be provided in the assembling machine for insuring a preliminary attachment of the shank and heel piece to the insole throughout the entire extent of the mutually contacting surfaces. This is particularly true if the intervening operation consists in the beveling of the marginal portions of the shank and heel piece since such operations in commercial practice are performed by a power operated machine which operates much more satisfactorily on an assembly of the type above referred to when the parts are attached together so that they may be handled as a unit without special attention to any particular portion of the work.

It is an object of the present invention to provide means which will insure the attachment of the two sole members together throughout the entire extent of their mutually contacting surfaces.

With the above object in view, the present invention in one aspect thereof consists in the provision, in a machine of the type above described, of a presser member for applying local pressure to a predetermined portion of one of said sole members, said presser member operating in combination with another pressure applying means to insure the attachment of said sole members throughout the entire extent of their mutually contacting surfaces. The illustrated machine is provided with means for locating a shank stiffener with relation to said sole members and the presser member is constructed and arranged to apply pressure to the work locally at opposite sides of said locating means. It frequently happens that the portion of the work operated upon by said presser member projects upwardly at an angle from the other work piece. In order to insure the attachment of a portion of a sole, so disposed, to another work piece, the illustrated presser member, in accordance with a feature of the invention, is constructed and arranged to apply rolling pressure to the work. In the illustrated organization, such rolling pressure progresses toward the end of the work piece and thus insures the attachment of the entire contacting surface of said end portion to the other work piece with no danger of injury to said end portion.

In accordance with a further feature of the invention, the means for applying local pressure is operated by the same actuator which operates the principal pressing means, hereinafter referred to as the presser. In the illustrated organization, the means for applying local pressure, hereinafter referred to as the presser member, is mounted independently of the presser and is actuated by a member mounted on the presser carrier. The presser member is advanced into pressing position in two stages first by movement of the presser carrier in one direction to bring the presser into registration with the work and second by movement of the carrier to bring the presser into pressing engagement with the work.

In accordance with a further feature of the invention, a suitable guard member is provided for preventing access of the fingers of the operator to the space beneath the presser member. In the illustrated organization, the guard member is positioned adjacent to the presser member at its toeward end and adjacent to the normal position of the right hand of the operator.

These and other features of the invention will now be described with reference to the accompanying drawings and pointed out in the appended claims.

In the drawings:

Fig. 1 is a front elevation with parts broken away illustrating a machine embodying the features of the present invention;

Fig. 2 is a perspective view illustrating in a machine of the same type as that shown in Fig. 1 means for applying local pressure to an end portion of a sole;

Fig. 3 is a section on a vertical plane common to the longitudinal median line of the rear portion of an insole in the machine illustrating the mechanism shown in Fig. 2, portions of the work supporting mechanism being shown in elevation;

Figure 4:
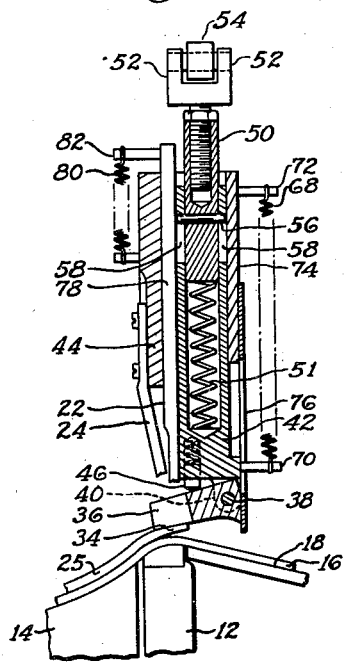
Figs. 4 and 5 are sectional elevations similar to Fig. 3 showing different stages in the operation of the machine.

The invention is herein illustrated as embodied in a machine having an organization generally similar to the machine illustrated in United States Letters Patent No. 2,083,583, granted on June 15, 1937, on an application filed in the name of John M. Whelton. In common with the machine disclosed in the Whelton patent, the machine illustrated generally in Fig. 1 comprises a base 10 which mounts work supporting means comprising a block 12 permanently secured to the base and a work supporting member 14 removably mounted in a recess in the block 12. The upper surface of the work supporting member 14 has substantially the same peripheral shape and contour as the heel and shank portion of an insole of corresponding size. The forepart of an insole such, for example, as the insole 16 illustrated in Fig. 1, is mounted on an inclined plane surface 18 and located lengthwise thereon by an abutment member 20. For locating one end of a metal shank stiffener with relation to the supported insole a member 22 (Fig. 2) which is channel shaped at its lower extremity is moved downwardly by the operation of a treadle (not shown) into engagement with the insole. After inserting the end of a shank stiffener into said locating member the treadle is further depressed to bring a holddown 24 into engagement with the shank stiffener. For pressing a shank and heel piece 25 (Fig. 6) against the insole and shank stiffener a presser 26 (Fig. 1) made of resilient material such as rubber is secured to a spring pressed plunger 27 carried by a vertical arm 28 which is moved forward manually by means of a handle 30 to bring the presser into vertical alinement with the shank and heel piece and to operate a clutch to bring into operation power mechanism for moving the presser downwardly to force the shank and heel piece into intimate contact with the shank stiffener and insole to cause them to be secured together by adhesive previously applied to the work parts.

Figure 6:
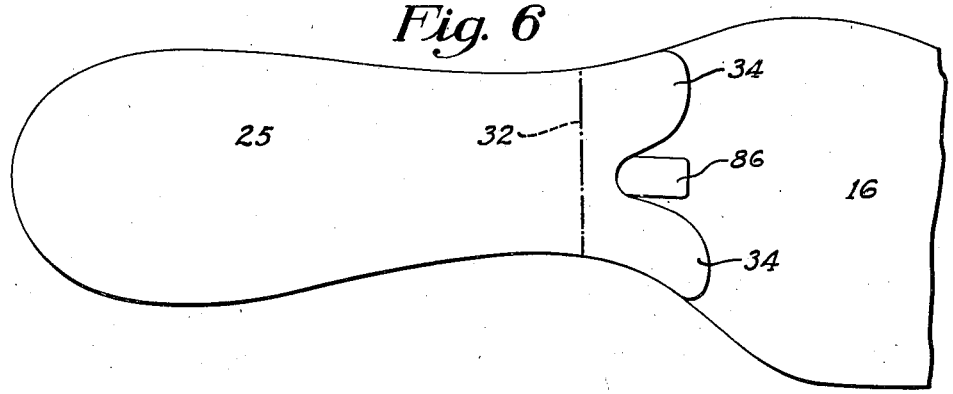
Fig. 6 is a plan view illustrating the assembled work pieces as they appear after they have been operated upon by the illustrated machine, the toe end portion of the insole being broken away.

The illustrated presser 26 engages that portion of the shank and heel piece extending heelwardly from a position indicated generally by a broken line 32 in Fig. 6 but does not engage that portion of the shank and heel piece extending toewardly from said line. In order to insure the cement attachment to the insole of that portion of the shank and heel piece which is not acted upon by the presser 26, and particularly the ears 34 at the toeward end of the shank and heel piece, the illustrated machine is provided with a presser member 36 (Fig. 2) constructed and arranged to apply pressure locally to said ears 34. The illustrated presser member is recessed as shown in Fig. 2, so that it may be arranged to straddle the member 22. Referring to Fig. 3, the presser member is mounted for angular movement on a cross pin 38 mounted in ears 40 projecting from the lower extremity of a carrier herein illustrated as a four-sided slide member 42 mounted for vertical sliding movement in a head 44. The presser member is normally arranged in its inclined position illustrated in Fig. 3 in which it is yieldingly maintained by two spring pressed pins 46 (Fig. 2). This position of the presser member is accurately determined by the engagement of that edge of the presser member at the toeward extremity of its top surface with the bottom face 48 of the slide member 42. The slide member is bored longitudinally for the greater part of its length to receive a plunger 50 and a spring 51. The plunger carries at its upper end a head characterized by upwardly projecting ears 52 between which a roll 54 is pivotally mounted. The illustrated orientation of the roll is maintained by the engagement of a cross pin 56 mounted in the plunger 50 in slots 58 in opposite sides of the slide member 42. In the illustrated machine the presser member 36 has two distinct and separate motions, the first being a manual downward movement to bring it into proximity to the work and the second movement being a further downward motion under power to bring the presser member forcibly against the work. The initial downward movement of the presser member is effected by the cam action of a plate 60 on the roll 54. The plate 60 is secured to the upper end of an upright member or bar 62 fixed to a bracket 64 secured to a bearing member 65 carried by an extension 67 of the arm 28. The initial downward movement occurs during the manual forward movement of the arm 28. Upon the completion of the manual movement of the arm the attached end portion 66 of the plate 60 engages the roll 54, said attached end portion being then in a horizontal position. The presser member 36 is now spaced above the work approximately the same distance as the presser 26 and consequently the power operation of the machine will cause said pressing elements to act substantially simultaneously upon the work. During the return movement of the arm 28 the slide member 42 is moved upwardly to retract the presser member by a spring 68 (Fig. 3) one end of which engages a pin 70 in a toewardly projecting portion of the slide while the other end engages a pin 72 mounted in a plate 74 secured to the head 44.

In order to protect the operator against injury to his fingers by the presser member 36 a suitable guard plate 76 is secured to the lower portion of the plate 74 and arranged to extend downwardly into a position in which it prevents access of the fingers of the operator to the space beneath the presser member.

In the illustrated machine the member 22 which locates the shank stiffener is secured to a slide 78 (Fig. 3) which is positioned in contact with the heelwardly facing surface of the slide member 42 and mounted in a suitable groove in the head 44. The holddown 24 is rigidly secured to the head. The member 22 is urged downwardly by a spring 80, the normal position of said member being determined by the engagement of the pin 82 in the upper portion of the slide 78 with the top face of the head 44.

Figure 5:
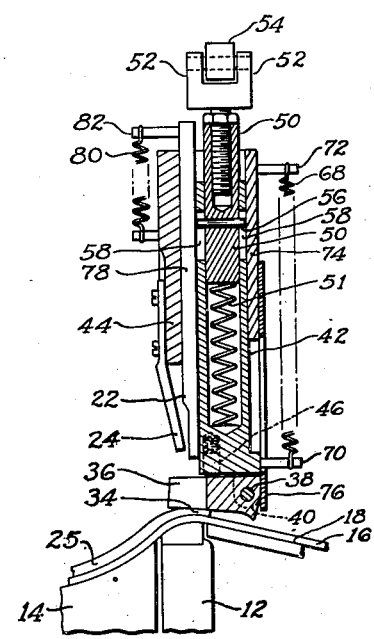

In the operation of the machine the insole 16 is mounted on the work supporting members and a treadle (not shown) is depressed to impart downward movement to a vertical sliding shaft 84 which mounts the head 44. When the lower extremity of the member 22 engages the insole the operation of the treadle is interrupted to permit the operator to place a steel shank stiffener 86 (Fig. 6) on the insole and insert its toeward end between the opposite side walls of said shank locating member. The treadle is then further depressed to cause the holddown 24 to engage the shank stiffener and hold it in position on the insole. A shank and heel piece 25 (Fig. 6) is then placed upon the insole and shank stiffener whereupon the operator grasps the handle 30 and advances the arm 28 to bring the presser 26 and the presser member 36 into registration with the work. The advancement of the arm 28 operates a one-revolution clutch (not shown) to connect a continuously rotating pulley 88 (Fig. 1) to a drive shaft 90 on which is mounted a cam 92 which operates a lever 94 on which the lower end portion of the arm 28 is pivotally mounted. The operation of the lever 94 moves the arm 28 downwardly to force the presser 26 and presser member 36 against the work. The presser member 36 operates upon the ears 34 of the shank and heel piece with a rolling action, as shown in Figs. 4 and 5, thus obviating possible injury to the ears 34 by said presser members. After one complete revolution of the drive shaft 90 the clutch is disengaged by a known mechanism not illustrated in the drawings and the machine comes to rest with the arm 28 at the limit of its upward movement. As the machine stops the arm 28 is returned by gravity to its rest position and the operator takes his foot off the treadle, thus permitting a spring 96 to lift the member 22 and holddown 24 from the work sufficiently to permit its easy removal from the machine.

Having thus described our invention, what we claim as new and desire to secure by Letters Patent of the United States is:

1. In a machine for assembling two sole members and a stiffener, the combination with a work support, a stiffener locating member constructed and arranged to engage a sole member on the work support, a stiffener holddown, and a presser for pressing the sole members together upon the work support, of a presser member for applying local pressure to a predetermined portion of one of said sole members.

2. In a machine for assembling shoe bottom parts including a stiffener and a sole member of less than shoe bottom length, a work support, a stiffener holddown, a presser constructed and arranged to operate on said sole member, and a presser member constructed and arranged to operate locally on an end portion of said sole member.

3. In a machine for assembling shoe bottom elements including a shank stiffener and a sole member of less than shoe bottom length, the combination with a work support, a presser for pressing the work parts against said support, means for locating the shank stiffener with relation to the other work parts, and a head for mounting said locating means, of means mounted in said head for applying pressure locally to an end portion of said sole member.

4. In a machine for assembling shoe bottom parts including a stiffener and a sole member of less than shoe bottom length, the combination with a stiffener holddown and means for pressing the shoe bottom parts together, of means for applying rolling pressure locally to an end portion of said sole member.

5. In a machine for assembling two sole members and a stiffener, a work support, a stiffener holddown, a presser constructed and arranged to press said sole members against said work support, means for applying pressure locally to a predetermined portion of one of said sole members, and a common actuator for said presser and said pressing means.

6. In a machine for assembling shoe bottom elements including a shank stiffener and a sole member of less than shoe bottom length, the combination with a work support, a presser for pressing said shoe bottom elements against said support, means for locating the shank stiffener with relation to the other shoe bottom elements, and a head for mounting said locating means, of means mounted in said head for applying pressure locally to an end portion of said sole member, and a guard member secured to said head in adjacent relation to said pressure applying means.

7. In a machine for pressing two sole members together, work supporting means, a presser constructed and arranged to operate on said sole members, a presser member for applying pressure locally to an end portion of one of said sole members, a carrier for said presser, and means actuated by movement of said carrier for advancing said presser member.

8. In a machine for assembling a shank and heel piece and another sole member, work supporting means, a presser constructed and arranged to operate upon a portion only of said shank and heel piece, a presser member constructed and arranged to apply pressure locally to the toeward end portion of said shank and heel piece, a carrier for said presser, and a member actuated by movement of said carrier to advance said presser member.

9. In a machine for assembling a shank and heel piece, a shank stiffener and a sole member, a member for locating the shank stiffener relatively to the other work parts, a head for mounting said locating member, a presser constructed and arranged to operate on a portion only of the shank and heel piece, and means mounted in said head for applying pressure locally to portions of the shank and heel piece at opposite sides of said locating member.

10. In a machine for pressing together two sole members and a stiffener, a stiffener holddown, a presser constructed and arranged to operate on a portion only of the work, means for applying pressure locally to an end portion of one of said sole members, and means mounting said pressure applying means independently of said presser.

11. In a machine for pressing together two sole members and a stiffener, stiffener locating means, a stiffener holddown, a presser constructed and arranged to operate on a portion only of the work, means for applying pressure locally to an end portion of one of said sole members, means mounting said pressure applying means independently of said presser, an actuator operable manually to advance the pressure applying means into proximity to the work, and means for further advancing said pressure applying means into pressing engagement with the work.

12. In a machine for assembling a shank and heel piece, a stiffener, and another sole member, a member for holding said stiffener against said sole member, a presser constructed and arranged to operate on a portion only of said shank and heel piece, and a presser member constructed and arranged to operate progressively toewardly upon the toeward end portion of said shank and heel piece.

13. In a machine for pressing two sole members together, the combination with a presser of means for applying pressure locally to an end portion of one of said sole members comprising a presser member, a carrier on which said presser member is mounted for angular movement upon engagement with the work, and means mounted on said carrier for urging said presser member angularly toward the work.

14. In a machine for pressing together two sole members and a stiffener positioned between them, a holddown for said stiffener, means for applying pressure locally to an end portion of one of said sole members comprising a presser member, a carrier on which said presser member is mounted for angular movement upon engagement with the work, means mounted on said carrier for urging said presser member angularly toward the work, means for advancing said carrier to bring said presser member into proximity to the work, and means for further actuating said carrier to advance said presser member into pressing engagement with the work.

15. In a machine for pressing together two sole members and a stiffener positioned between them, a holddown for said stiffener, a presser constructed and arranged to operate on a portion only of a sole member, a first carrier for said presser, a presser member for applying pressure locally to an end portion of said sole member, a second carrier on which said presser member is mounted for angular movement upon engagement with the work, means mounted on said second carrier for urging said presser member angularly toward the work, means actuated by movement of said first carrier for bringing said presser member into proximity to the work, and means for further actuating said second carrier to advance said presser member into pressing engagement with the work.

16. In a machine for pressing two sole members together, a presser constructed and arranged to operate on a portion only of a sole member, a first carrier for said presser, a presser member for applying pressure locally to an end portion of said sole member, a second carrier on which said presser member is mounted, and means actuated by movement of said first carrier in one direction to advance said second carrier to bring said presser member into proximity to the work, said last-mentioned means being further actuated by movement of the first carrier in another direction to further advance said second carrier to bring said presser member into pressing engagement with the work.

17. In a machine for pressing two sole members together, a presser constructed and arranged to operate on a portion only of a sole member, a first carrier for said presser, a presser member for applying pressure locally to an end portion of said sole member, a second carrier on which said presser member is mounted, and a cam on said first carrier operable by movement of the first carrier in one direction to bring said presser member into proximity to the work, and further operable by movement of said first carrier in another direction to further advance said presser member into pressing engagement with the work.

WILLIAM HENRY HEGGS.
HAROLD GRIMALDI HEATHER.

REFERENCES CITED

The following references are of record in the file of this patent:

UNITED STATES PATENTS

| Number | Name | Date |
|---|---|---|
| 1,939,750 | Winkley | Dec. 19, 1933 |
| 2,020,344 | Winkley | Nov. 12, 1935 |
| 2,083,583 | Whelton | June 15, 1937 |
| 2,106,279 | Ross | Jan. 25, 1938 |
| 2,134,100 | Bray | Oct. 25, 1938 |
| 2,151,974 | Kennison et al. | Mar. 28, 1939 |
| 2,263,134 | Hoza | Nov. 18, 1941 |